US006704717B1

(12) United States Patent
Tate

(10) Patent No.: US 6,704,717 B1
(45) Date of Patent: Mar. 9, 2004

(54) ANALYTIC ALGORITHM FOR ENHANCED BACK-PROPAGATION NEURAL NETWORK PROCESSING

(75) Inventor: Brian Don Tate, Escondido, CA (US)

(73) Assignee: NCR Corporation, Dayton, OH (US)

(*) Notice: Subject to any disclaimer, the term of this patent is extended or adjusted under 35 U.S.C. 154(b) by 539 days.

(21) Appl. No.: 09/642,981

(22) Filed: Aug. 18, 2000

Related U.S. Application Data

(60) Provisional application No. 60/156,548, filed on Sep. 29, 1999.

(51) Int. Cl.[7] .............................................. G06F 15/16
(52) U.S. Cl. ............................ 706/15; 706/16; 706/50; 706/25
(58) Field of Search ................................ 706/12, 15–60

(56) References Cited

U.S. PATENT DOCUMENTS

| | | | | |
|---|---|---|---|---|
| 5,701,400 A | | 12/1997 | Amado | 706/45 |
| 5,765,028 A | * | 6/1998 | Gladden | 706/25 |
| 5,933,818 A | * | 8/1999 | Kasravi et al. | 706/12 |
| 5,970,482 A | * | 10/1999 | Pham et al. | 706/16 |

OTHER PUBLICATIONS

The KDD Process for Extracting Useful Knowledge from Volumes of Data, Usama Fayyad, Gregory Paitetsky–Shapiro, Padhriac Smyth, Communications of the ACM, Nov. 1996/vol. 30, No. 11, pps. 27–34.*

(List continued on next page.)

*Primary Examiner*—Anil Khatri
*Assistant Examiner*—Michael B. Holmes
(74) *Attorney, Agent, or Firm*—Gates & Cooper LLP

(57) ABSTRACT

A method, apparatus, and article of manufacture for performing data mining applications in a relational database management system. At least one analytic algorithm for enhanced back-propagation neural network processing is performed by a computer, wherein the analytic algorithm for enhanced back-propagation neural network processing includes SQL statements performed by the relational database management system directly against the relational database and programmatic iteration. The analytic algorithm for enhanced back-propagation neural network processing operates on data in the relational database that has been partitioned into training, testing and validation data sets. The analytic algorithm for enhanced back-propagation neural network processing maps the data in the training data sets to nodes in the neural network wherein the data is processed as it moves from an input node of the neural network through a hidden node of the neural network to an output node of the neural network. In addition, the analytic algorithm for enhanced back-propagation neural network processing determines an error difference between the output node's value and a target value as the data is mapped to the output node in the neural network, and changes a weight value for one or more of the nodes based on an accumulation of the error difference for the node, in order to get the neural network to converge on a solution. Finally, the analytic algorithm for enhanced back-propagation neural network processing cross-validates the changed weight value to prevent overfitting the node.

39 Claims, 4 Drawing Sheets

OTHER PUBLICATIONS

Strategic Directions in Artificial Intelligence, Jon Doyle, Thomas Dean et al., ACM Computing Surveys, vol. 28, No. 4, Dec. 1996, pps. 653–670.*

Discovering Internet Marketing Intelligence through Online Analytical Web Usage Mining, Alex G. Bucher, Maurice D. Mulvenna, ACM SIGMOND Record, vol. 27, No. 4, Dec. 1998, pps. 54–61.*

Application of Intelligent Agent Technology for Managerial Data Analysis and Mining, Ranjit Bose, Vijayan Sugumaran, The Database for Advances in Information Systems—Winter 1999 (vol. 30, No. 1) pps. 77–94.*

Towards On–Line Analytical Mining in Large databases, Jiawei Han, ACM SIGMOND Record, vol. 27, Issue, (Mar. 1998) pps. 07–107.*

Intuitive Decision–Making, Viki L. Sauter, Communications of the ACM Jun. 1999/vol. 42, No. 6, 109–115.*

Data Clustering: A Review, A.K. Jainj, M.N. Murty, P.J. Flynn, ACM Computing Surveys, vol. 31, No. 3, Sep. 1999, pps. 264–323.*

* cited by examiner

ANALYTIC ALGORITHM FOR ENHANCED BACK-PROPAGATION NEURAL NETWORK PROCESSING

CROSS-REFERENCE TO RELATED APPLICATIONS

This application claims the benefit under 35 U.S.C §119 (e) of the co-pending and comnmonly-assigned U.S. provisional patent application Serial No. 60/156,548, filed on Sep. 29, 1999, by Brian D. Tate, entitled Enhanced Back-Propagation Neural Network Application, which application is incorporated by reference herein.

This application is also related to the following co-pending and commonly-assigned utility patent applications:

Application Serial No. PCT/US99/22966, filed on Oct. 1, 1999, by Timothy E. Miller, Brian D. Tate, James D. Hildreth, Todd M. Brye, Anthony L. Rollins, James E. Pricer, and Tej Anand, entitled SQL-Based Analytic Algorithms, Application Ser. No. 09/410,528, filed on Oct. 1, 1999, by Brian D. Tate, James E. Pricer, Tej Anand, and Randy G. Kerber, entitled SQL-Based Analytic Algorithm for Association, Application Ser. No. 09/410,531, filed on Oct. 1, 1999, by james D. Hildreth, entitled SQL-Based Analytic Algorithm for Clustering, Application Ser. No. 09/411,818, filed on Oct. 1, 1999, by Brian D. Tate, entitled SQL-Based Automated Histogram Bin Data Derivation Assist, Application Ser. No. 09/410,534, filed on Oct. 1, 1999, by Brian D. Tate, entitled SQL-Based Automated, Adaptive, Histogram Bin Data Description Assist, Application Serial No. PCT/US99/22995, filed on Oct. 1, 1999, by Timothy E. Miller, Brian D. Tate, Miriam H. Herman, Todd M. Brye, and Anthony L. Rollins, entitled Data Mining Assists in a Relational Database Management System, Application Ser. No. 09/411,809, filed on Oct. 1, 1999, by Todd M. Brye, Brian D. Tate, and Anthony L. Rollins, entitled SQL-Based Data Reduction Techniques for Delivering Data to Analytic Tools, Application Serial No. PCT/US99/23031, filed on Oct. 1, 1999, by Timothy E. Miller, Miriam H. Herman, and Anthony L. Rolins, entitled Techniques for Deploying Analytic Models in Parallel, Application Serial No. PCT/US99/23019 on Oct. 1, 1999, by Timothy E. Miller, Brian D. Tate, and Anthony L. Rollins, entitled Analytic Logical Data Model, and Application Ser. No. 09/410,530, filed on Oct. 1, 1999, by Todd M. Brye, entitled SQL-Based Analytic Algorithm for Rule Induction, all of which applications are incorporated by reference herein.

BACKGROUND OF THE INVENTION

1. Field of the Invention

This invention relates in general to a relational database management system, and in particular, to an enhanced back-propagation neural network application that creates analytic models from the data residing in a relational database.

2. Description of Related Art

Relational databases are the predominate form of database management systems used in computer systems. Relational database management systems are often used in so called "data warehouse" applications where enormous amounts of data are stored and processed. In recent years, several trends have converged to create a new class of data warehousing applications known as data mining applications. Data mining is the process of identifying and interpreting patterns in databases, and can be generalized into three stages.

Stage one is the reporting stage, which analyzes the data to determine what happened. Generally, most data warehouse implementations start with a focused application in a specific functional area of the business. These applications usually focus on reporting historical snap shots of business information that was previously difficult or impossible to access. Examples include Sales Revenue Reporting, Production Reporting and Inventory Reporting to name a few.

Stage two is the analyzing stage, which analyzes the data to determine why it happened. As stage one end-users gain previously unseen views of their business, they quickly seek to understand why certain events occurred; for example, a decline in sales revenue. After discovering a reported decline in sales, data warehouse users will then obviously ask, "Why did sales go down?" Leaming the answer to this question typically involves probing the database through an iterative series of ad hoc or multidimensional queries until the root cause of the condition is discovered. Examples include Sales Analysis, Inventory Analysis or Production Analysis.

Stage three is the predicting stage, which tries to determine what will happen. As stage two users become more sophisticated, they begin to extend their analysis to include prediction of unknown events. For example, "Which end-users are likely to buy a particular product", or "Who is at risk of leaving for the competition?" It is difficult for humans to see or interpret subtle relationships in data, hence as data warehouse users evolve to sophisticated predictive analysis they soon reach the limits of traditional query and reporting tools. Data mining helps end-users break through these limitations by leveraging intelligent software tools to shift some of the analysis burden from the human to the machine, enabling the discovery of relationships that were previously unknown.

Many data mining technologies are available, from single algorithm solutions to complete tool suites. Most of these technologies, however, are used in a desktop environment where little data is captured and maintained. Therefore, most data mining tools are used to analyze small data samples, which were gathered from various sources into proprietary data structures or flat files. On the other hand, organizations are beginning to amass very large databases and end-users are asking more complex questions requiring access to these large databases.

Unfortunately, most data mining technologies cannot be used with large volumes of data. Further, most analytical techniques used in data mining are algorithmic-based rather than data-driven, and as such, there are currently little synergy between data mining and data warehouses. Moreover, from a usability perspective, traditional data mining techniques are too complex for use by database administrators and application programmers, and are too difficult to change for a different industry or a different customer.

Thus, there is a need in the art for data mining applications that directly operate against data warehouses, and that allow non-statisticians to benefit from advanced mathematical techniques available in a relational environment.

SUMMARY OF THE INVENTION

To overcome the limitations in the prior art described above, and to overcome other limitations that will become apparent upon reading and understanding the present specification, the present invention discloses a method, apparatus, and article of manufacture for performing data mining applications in a relational database management system. At least one analytic algorithm for enhanced back-propagation neural network processing is performed by a computer, wherein the analytic algorithm for enhanced back-propagation neural network processing includes SQL statements performed by the relational database management system directly against the relational database and programmatic iteration. The analytic algorithm for enhanced back-propagation neural network processing operates on data in the relational database that has been partitioned into training, test and validation data sets. The analytic algorithm for enhanced back-propagation neural network processing maps data in a training data set to nodes in the neural network, wherein the data is processed as it moves from an input node of the neural network through a hidden node of the neural network to an output node of the neural network In addition, the analytic algorithm for enhanced back-propagation neural network processing determines an error difference between the output node's value and a target value as the data is mapped to the output node in the neural network, and changes a weight value for one or more of the nodes based on an accumulation of the error difference for the node, in order to get the neural network to converge on a solution. Finally, the analytic algorithm for enhanced back-propagation neural network processing cross-validates the changed weight value to prevent overfitting the node.

An object of the present invention is to provide more efficient usage of parallel processor computer systems. An object of the present invention is to provide a foundation for data mining tool sets in relational database management systems. Further, an object of the present invention is to allow data mining of large databases.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention provides a relational database management system (RDBMS) that supports data mining operations of relational databases. In essence, advanced analytic processing capabilities for data mining applications are placed where they belong, i.e., close to the data. Moreover, the results of these analytic processing capabilities can be made to persist within the database or can be exported from the database. These analytic processing capabilities and their results are exposed externally to the RDBMS by an application programmable interface (API).

According to the preferred embodiment, the data mining process is an iterative approach referred to as a "Knowledge Discovery Analytic Process" (KDAP). There are six major tasks within the KDAP:

1. Understanding the business objective.
2. Understanding the source data available.
3. Selecting the data set and "pre-processing" the data.
4. Designing the analytic model.
5. Creating and testing the models.
6. Deploying the analytic models.

The present invention provides various components for addressing these tasks:

An RDBMS that executes Structured Query Language (SQL) statements against a relational database.

An analytic Application Programming Interface (API) that creates scalable data mining functions comprised of complex SQL statements.

Application programs that instantiate and parameterize the analytic API.

Analytic algorithms utilizing:
  Extended ANSI SQL statements,
  a Call Level Interface (CLI) comprised of SQL statements and programmatic iteration, and
  a Data Reduction Utility Program comprised of SQL statements and programmatic iteration.

An analytical logical data model (LDM) that stores results from and information about the advanced analytic processing in the RDBMS.

A parallel deployer that controls parallel execution of the results of the analytic algorithms that are stored in the analytic logical data model.

The benefits of the present invention include:

Data mining of very large databases directly within a relational database.

Management of analytic results within a relational database.

A comprehensive set of analytic operations that operate within a relational database management system Application integration through an object-oriented API.

These components and benefits are described in more detail below.

Hardware Environment

Figure 1:
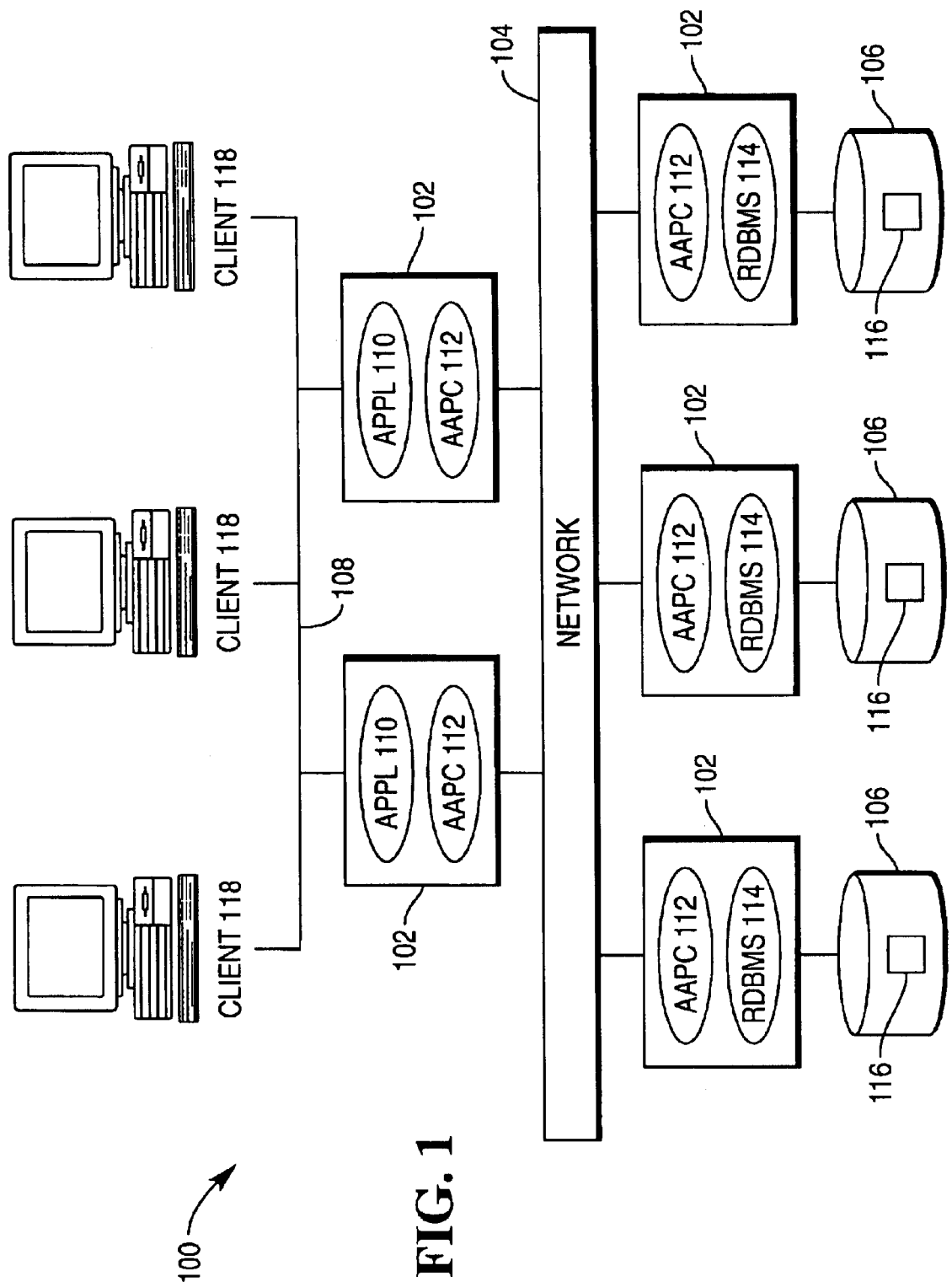
FIG. 1 is a block diagram that illustrates an exemplary computer hardware environment that could be used with the preferred embodiment of the present invention.

FIG. 1 is a block diagram that illustrates an exemplary computer hardware environment that could be used with the preferred embodiment of the present invention. In the exemplary computer hardware environment, a massively parallel processing (MPP) computer system 100 is comprised of one or more processors or nodes 102 interconnected by a network 104. Each of the nodes 102 is comprised of one or more processors, random access memory (RA), read-only memory (ROM), and other components. It is envisioned that attached to the nodes 102 may be one or more fixed and/or removable data storage units PSUs) 106 and one or more data communications units (DCUs) 108, as is well known in the art.

Each of the nodes 102 executes one or more computer programs, such as a Data Mining Application (APPL) 110 performing data mining operations, Advanced Analytic Processing Components (AAPC) 112 for providing advanced analytic processing capabilities for the data miring operations, and/or a Relational Database Management System (RDBMS) 114 for managing a relational database 116 stored on one or more of the DSUs 106 for use in the data mining applications, wherein various operations are performed in the APPL 110, AAPC 112, and/or RDBMS 114 in response to commands from one or more Clients 118. In alternative embodiments, the APPL 110 may be executed in one or more of the Clients 118, or on an application server on a different platform attached to the network 104.

Generally, the computer programs are tangibly embodied in and/or retrieved from RAM, ROM, one or more of the DSUs 106, and/or a remote device coupled to the computer system 100 via one or more of the DCUs 108. The computer programs comprise instructions which, when read and executed by a node 102, causes the node 102 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention. In addition, it should be understood that the present invention may also apply to other computer programs than those disclosed herein.

Logical Architecture

Figure 2:
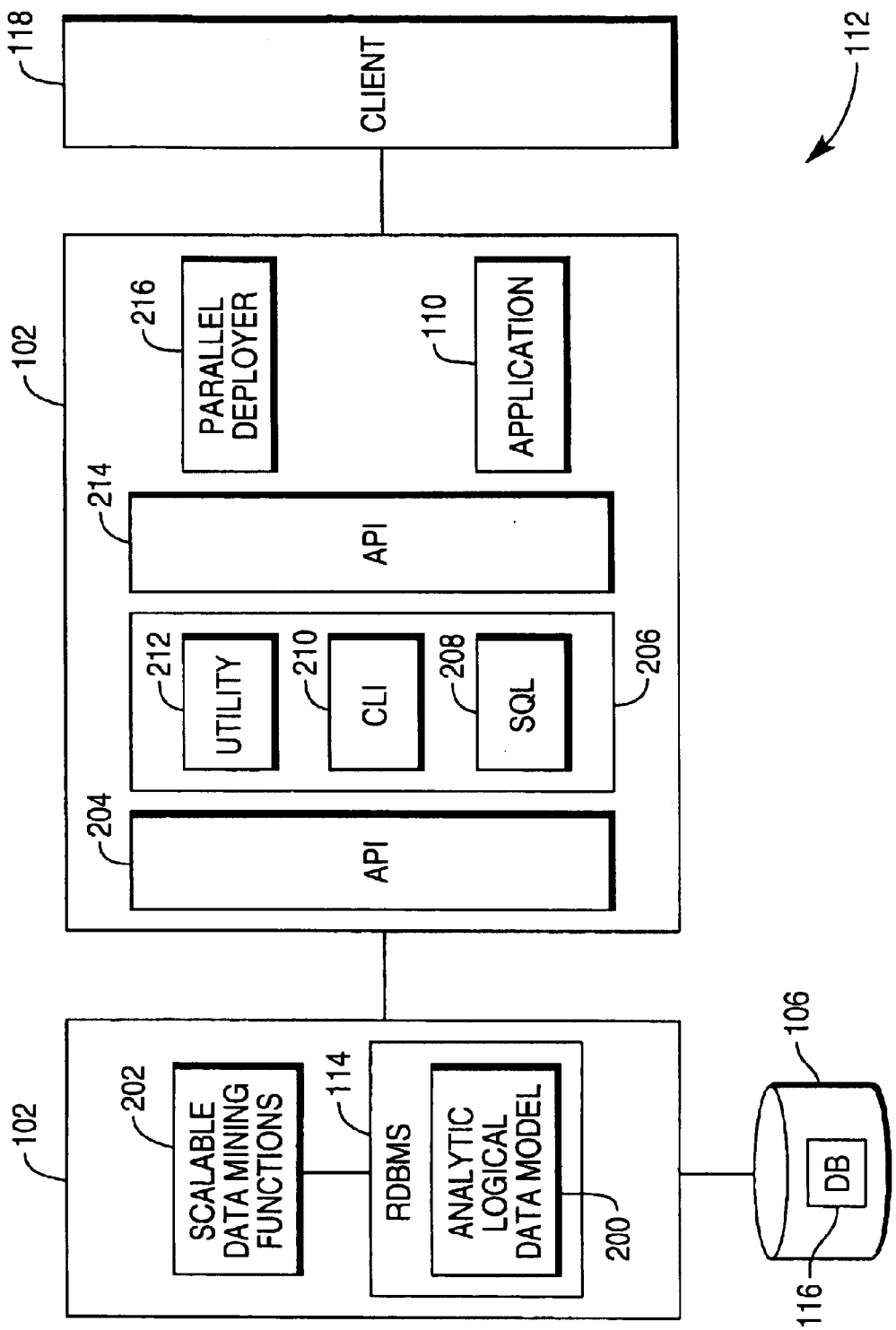
FIG. 2 is a block diagram that illustrates an exemplary logical architecture that could be used with the preferred embodiment of the present invention.

FIG. 2 is a block diagram that illustrates an exemplary logical architecture of the AAPC 112, and its interaction with the APPL 110, RDBMS 114, relational database 116, and Client 118, according to the preferred embodiment of the present invention. In the preferred embodiment, the AAPC 112 includes the following components:

An Analytic Logical Data Model (LDM) 200 that stores results from the advanced analytic processing in the RDBMS 114, One or more Scalable Data Mining Functions 202 that comprise complex, optimized SQL statements that perform advanced analytic processing in the RDBMS 114, An Analytic Application Programming Interface (API) 204 that provides a mechanism for an APPL 110 or other component to invoke the Scalable Data Mining Functions 202, One or more Analytic Algorithms 206 that can operate as standalone applications or can be invoked by another component, wherein the Analytic Algorithms 206 comprise:

Extended ANSI SQL 208 that can be used to implement a certain class of Analytic Algorithms 206, A Call Level Interface ((CLI) 210 that can be used when a combination of SQL and programmatic iteration is required to implement a certain class of Analytic Algorithms 206, and A Data Reduction Utility Program 212 that can be used to implement a certain class of Analytic Algorithms 206 where data is first reduced using SQL followed by programmatic iteration.

An Analytic Algorithm Application Programming Interface (API) 214 that provides a mechanism for an APPL 110 or other components to invoke the Analytic Algorithms 206, A Parallel Deployer 216 that controls parallel executions of the results of an Analytic Algorithm 206 (sometimes referred to as an analytic model) that are stored in the Analytic LDM 200, wherein the results of executing the Parallel Deployer 216 are stored in the RDBMS 114.

Note that the use of these various components is optional, and thus only some of the components may be used in any particular configuration.

The preferred embodiment is oriented towards a multi-tier logical architecture, in which a Client 118 interacts with the various components described above, which, in turn, interface to the RDBMS 114 to utilize a large central repository of enterprise data stored in the relational database 116 for analytic processing.

In one example, a Client 118 interacts with an APPL 110, which interfaces to the Analytic API 204 to invoke one or more of the Scalable Data Mining Functions 202, which are executed by the RDBMS 114. The results from the execution of the Scalable Data Mining Functions 202 would be stored as an analytic model within an Analytic LDM 200 in the RDBMS 114.

In another example, a Client 118 interacts with one or more Analytic Algorithms 206 either directly or via the Analytic Algorithm API 214. The Analytic Algorithms 206 comprise SQL statements that may or may not include programmatic iteration, and the SQL statements are executed by the RDBMS 114. In addition, the Analytic Algorithms 206 may or may not interface to the Analytic API 204 to invoke one or more of the Scalable Data Mining Functions 202, which are executed by the RDBMS 114. Regardless, the results from the execution of the Analytic Algorithms 206 would be stored as an analytic model within an Analytic LDM 200 in the RDBMS 114.

In yet another example, a Client 118 interacts with the Parallel Deployer 216, which invokes parallel instances of the results of the Analytic Algorithms 206, sometimes referred to as an Analytic Model. The Analytic Model is stored in the Analytic LDM 200 as a result of executing an instance of the Analytic Algorithms 206. The results of executing the Parallel Deployer 216 are stored in the RDBMS 114.

In still another example, a Client 118 interacts with the APPL 110, which invokes one or more Analytic Algorithms 206 either directly or via the Analytic Algorithm API 214. The results would be stored as an analytic model within an Analytic LDM 200 in the RDBMS 114.

The overall goal is to significantly improve the performance, efficiency, and scalability of data mining operations by performing compute and/or I/O intensive operations in the various components. The preferred embodiment achieves this not only through the parallelism provided by the MPP computer system 100, but also from reducing the amount of data that flows between the APPL 110, AAPC 112, RDBMS 114, Client 118, and other components.

Those skilled in the art will recognize that the exemplary configurations illustrated and discussed in conjunction with FIG. 2 are not intended to limit the present invention. Indeed, those skilled in the art will recognize that other alternative configurations may be used without departing from the scope of the present invention. In addition, it should be understood that the present invention may also apply to other components than those disclosed herein.

Scalable Data Mining Functions

The Scalable Data Mining Functions 202 comprise complex, optimized SQL statements that are created, in the preferred embodiment, by parameterizing and instantiating the corresponding Analytic APIs 204. The Scalable Data Mining Functions 202 perform much of the advanced analytic processing for data mining applications, when performed by the RDBMS 114, without having to move data from the relational database 116.

The Scalable Data Mining Functions 202 can be categorized by the following functions:

Data Description: The ability to understand and describe the available data using statistical techniques. For example, the generation of descriptive statistics, frequencies and/or histogram bins.

Data Derivation: The ability to generate new variables (transformations) based upon existing detailed data when designing an analytic model. For example, the generation of predictive variables such as bitmaps, ranges, codes and mathematical functions.

Data Reduction: The ability to reduce the number of variables (columns) or observations (rows) used when designing an analytic model. For example, creating Covariance, Correlation, or Sum of Squares and Cross-Products (SSCP) Matrices.

Data Reorganization: The ability to join or denormalize pre-processed results into a wide analytic data set.

Data Sampling/Partitioning: The ability to intelligently request different data samples or data partitions. For example, hash data partitioning or data sampling.

The principal theme of the Scalable Data Mining Functions 202 is to facilitate analytic operations within the RDBMS 114, which process data collections stored in the database 116 and produce results that also are stored in the database 116. Since data mining operations tend to be iterative and exploratory, the database 116 in the preferred embodiment comprises a combined storage and work space environment. As such, a sequence of data mining operations is viewed as a set of steps that start with some collection of tables in the database 116, generate a series of intermediate work tables, and finally produce a result table or view.

Analytic Algorithms

The Analytic Algorithms 206 provide statistical and "machine learning" methods to create Analytic LDMs 200 from the data residing in the relational database 116. Analytic Algorithms 206 that are completely data driven, such as association, can be implemented solely in Extended ANSI SQL 208. Analytic Algorithms 206 that require a combination of SQL and programmatic iteration, such as induction, can be implemented using the CLI 210. Finally, Analytic Algorithms 206 that require almost complete programmatic iteration, such as clustering, can be implemented using a Data Reduction UtilityProgram 212. This approach involves data pre-processing that reduces the amount of data that a non-SQL algorithm can then process.

The Analytic Algorithms 206 significantly improve the performance and efficiency of data mining operations by providing the technology components to perform advanced analytic operations directly against the RDBMS 114. In addition, the Analytic Algorithms 206 leverage the parallelism that exists in the MPP computer system 100, the RDBMS 114, and the database 116.

The Analytic Algorithms 206 provide data analysts with an unprecedented option to train and apply "machine learning" analytics against massive amounts of data in the relational database 116. Prior techniques have failed as their sequential design is not optimal in an RDBMS 114 environment. Because the Analytic Algorithms 206 are implemented in Extended ANSI SQL 208, through the CLI 210, and/or by means of the Data Reduction Utility Program 212, they can therefore leverage the scalability available on the MPP computer system 100. In addition, taking a data-driven approach to analysis, through the use of complete Extended ANSI SQL 208, allows people other than highly educated statisticians to leverage the advanced analytic techniques offered by the Analytic Algorithms 206.

Analytic Logical Data Model

The Analytic LDM 200, which is integrated with the relational database 116 and the RDBMS 114, provides logical entity and attribute definitions for advanced analytic processing, i.e., the Scalable Data Mining Functions 202 and Analytic Algorithms 206, performed by the RDBMS 114 directly against the relational database 116. These logical entity and attribute definitions comprise metadata that define the characteristics of data stored in the relational database 116, as well as metadata that determines how the RDBMS 114 performs the advanced analytic processing. The Analytic LDM 200 also stores processing results from this advanced analytic processing, which includes both result tables and derived data for the Scalable Data Mining Functions 202, Analytic Algorithms 206, and the Parallel Deployer 216. The Analytic LDM 200 is a dynamic model, since the logical entities and attributes definitions change depending upon parameterization of the advanced analytic processing, and since the Analytic LDM 200 is updated with the results of the advanced analytic processing.

Analytic Algorithm for Enhanced Back-Propagation Neural Network Processing

As mentioned above, Analytic Algorithms 206 that require a mix of programmatic iteration along with Extended ANSI SQL statements can be implemented using the Call-Level Interface (CLI) 210. An example is an Analytic Algorithm 206 for enhanced back-propagation neural network processing.

Programs for statistical modeling using neural network techniques have traditionally not been performed directly on the data stored in a relational database 116 in a RDBMS 114. They have also rarely made use of the scalable and parallel processing power available in a massively parallel processing (MPP) computer system 100.

In the preferred embodiment, the performance of the neural network techniques is dramatically improved through its implementation as an Analytic Algorithm 206 and through the use of the CLI 210, which provides a combination of programmatic iteration and dynamically-generated Extended ANSI SQL statements (for example, C++ code with embedded SQL statements). The Analytic Algorithm 206 for enhanced back-propagation neural network processing uses the dynamically-generated SQL statements to retrieve and process data from the RDBMS 114, and then processes the data using well-known neural network algorithms.

In a preferred embodiment, the neural network applies multi-layer perceptron neural network processing with a single hidden layer of nodes. However, those skilled in the art recognize that other neural network techniques could be used as well. For example, the present invention could be extended to other configurations and other network types, such as probabilistic neural networks, Kohonen self-organizing neural networks, etc.

In the preferred embodiment, the Analytic Algorithm 206 for enhanced back-propagation neural network processing operates on data from the relational database 116 that has been initially partitioned or sampled into training, test and validation data sets or tables. Other pre-processing may be performed as well. Preferably, these steps are performed directly in the RDBMS 114 through the use of dynamically-generated SQL statements.

The Analytic Algorithm 206 then maps data in a training data set to nodes in the neural network by moving the data forward through the neural network, wherein the data is processed as it moves from an input node of the neural network through a hidden node of the neural network to an output node of the neural network In this step, all of the rows of data in the training data set are processed. Moreover, this step is performed directly in the RDBMS 114 using dynamically-generated SQL statements.

For each of the output nodes in the neural network, the Analytic Algorithm 206 determines an error difference between the output node's value and a target value, as the data is mapped to the output node. This occurs as each row of input data, or example as it is sometimes called, is mapped onto the output nodes.

The error difference is used to calculate a partial derivative of a mean squared error with respect to the weight value for each of the nodes. The partial derivatives are calculated using dynamically-generated SQL statements, and are used to determine the changes to be made to the weights prior to the next epoch in network training.

Although, conceptually, the mapping of the data to the nodes can be completed prior to calculating any of the partial derivatives, the present invention performs the mapping and calculates the partial derivatives at the same time. This means that only one pass of the data needs to be made per training epoch, and only a small amount of data needs to be returned or stored in metadata in the Analytic LDM 200 (i.e., one summation value for each weight value in the network).

The Analytic Algorithm 206 changes a weight value for one or more of the nodes based on an accumulated error difference for the node. This is a "learning step," wherein the weight values for the nodes are changed in order to get the network to converge on a solution. Generally, this step is performed outside of the RDBMS 114 in the programmatic iteration of the Analytic Algorithm 206.

Various learning techniques are possible based upon the accumulated error difference, including adaptive learning, steepest descent, and quickprop. When the next epoch of training is performed, the new weight values are substituted for the previous weight values in the dynamically-generated SQL statements.

The Analytic Algorithm 206 also performs cross validation to prevent overfitting of the nodes of the neural network. Cross validation is achieved by interrupting the training cycle periodically, after some number of epochs have occurred (as determined by a user-defined parameter), and then iteratively performing the mapping function and determining the error amount based on the target output for every row of data in the validation data set. The error difference is summed over all the rows in the validation data set, and this sum is saved, along with the current weight values in use when the training cycle was interrupted. If the sum of the error differences has increased in absolute value since the last training cycle, then the training cycle is stopped, and the previously saved weight values are used in the final model of the neural network.

The cross validation step is performed directly on the validation data set in the relational database 116 by dynamically-generated SQL statements interpreted by the RDBMS 114. The SQL statements required are essentially the same as that used for the mapping and determining steps performed in previous cycles. However, in this case, the error difference is summed over all output nodes, rather than being summed for each node. Alternative techniques for interrupting the training cycle, and thus completing the construction of the neural network model, include stopping after a fixed number of epochs, or after a fixed amount of elapsed time.

Once the neural network model is trained, the resulting Analytic LDM 200 comprises a layout of the neural network with regard to input, hidden and output nodes, and the weight values for each of the nodes. The model stored in the Analytic LDM 200 can then be used to predict the value of the output nodes for other data sets, e.g., by re-creating the mapping step using the other data sets. This is also referred to as applying the model or scoring new data with the model.

One feature of the present invention is that the data intensive aspects of neural network training and cross validation are performed directly within the RDBMS 114 using dynamically-generated SQL. In particular, the iterative mapping of data and determining of the error differences, the summation of error differences, and the calculation of partial derivatives with respect to each weight value, is performed within the RDBMS 114 through the use of dynarically-generated SQL.

Another feature of the present invention is that the results of the neural network processing are stored as a model in the Analytic LDM 200. Specifically, the Analytic LDM 200 stores the layout of input, hidden and output nodes in the neural network, along with the final weight values at each connection and node in the network, at the time that the training cycle was stopped.

One advantage of the Analytic Algorithm 206 for enhanced back-propagation neural network processing is that it leverages the parallelism that exists in the MPP computer system 100, the RDBMS 114, and the relational database 116. Another advantage is that the Analytic Algorithm 206 facilitates neural network processing on very large training data sets, without moving large amounts of data out of the relational database 116. Yet another advantage is that metadata associated with the neural network processing, as well as a neural network model that results from the processing, can be stored directly in the relational database 116. This, combined with the mapping step implemented in SQL, makes it easy to automate the application of a neural network model by scoring directly in the database 116. Still another advantage is that the Analytic Algorithm 206 contributes to an integrated data mining capability, from exploratory statistical analysis, to predictive modeling, to the application of a constructed model.

Logic of the Preferred Embodiment

Figure 3:
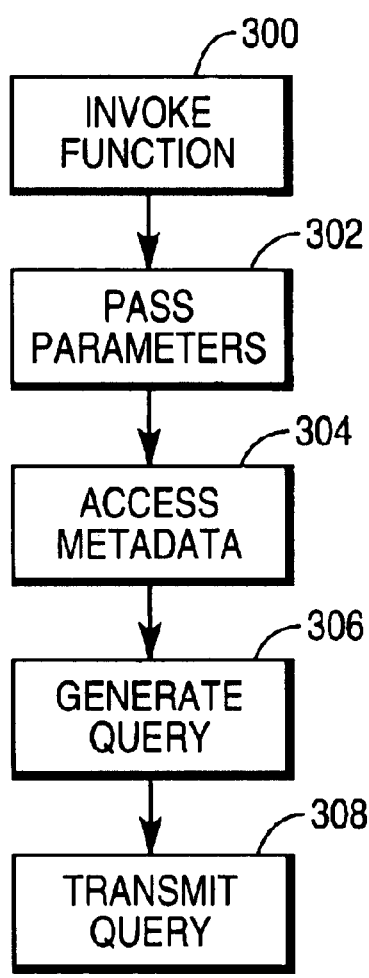
FIGS. 3, 4, and 5 are flowcharts that illustrate exemplary logic performed according to the preferred embodiment of the present invention.
Figure 5:
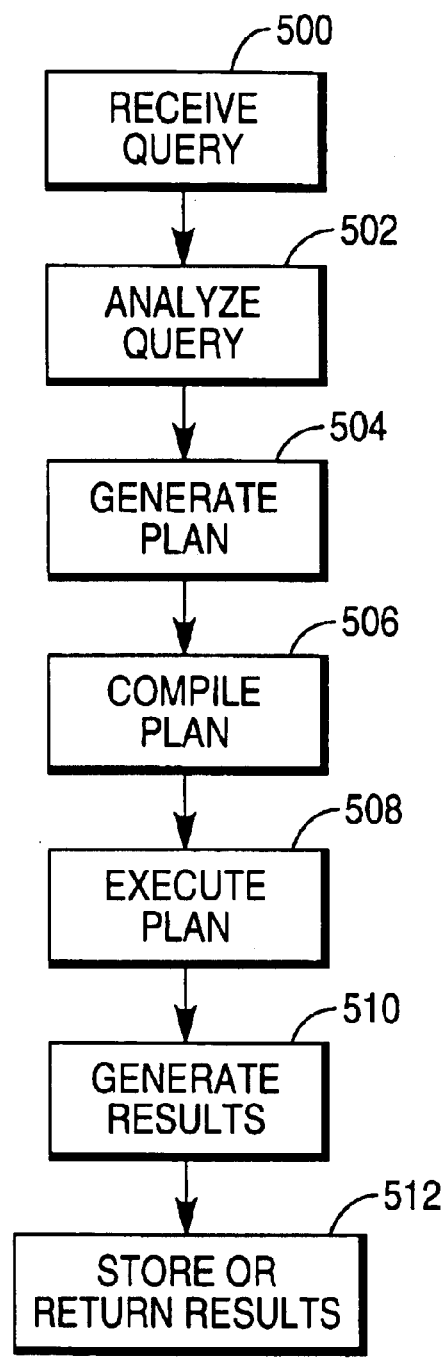
Figure 4:
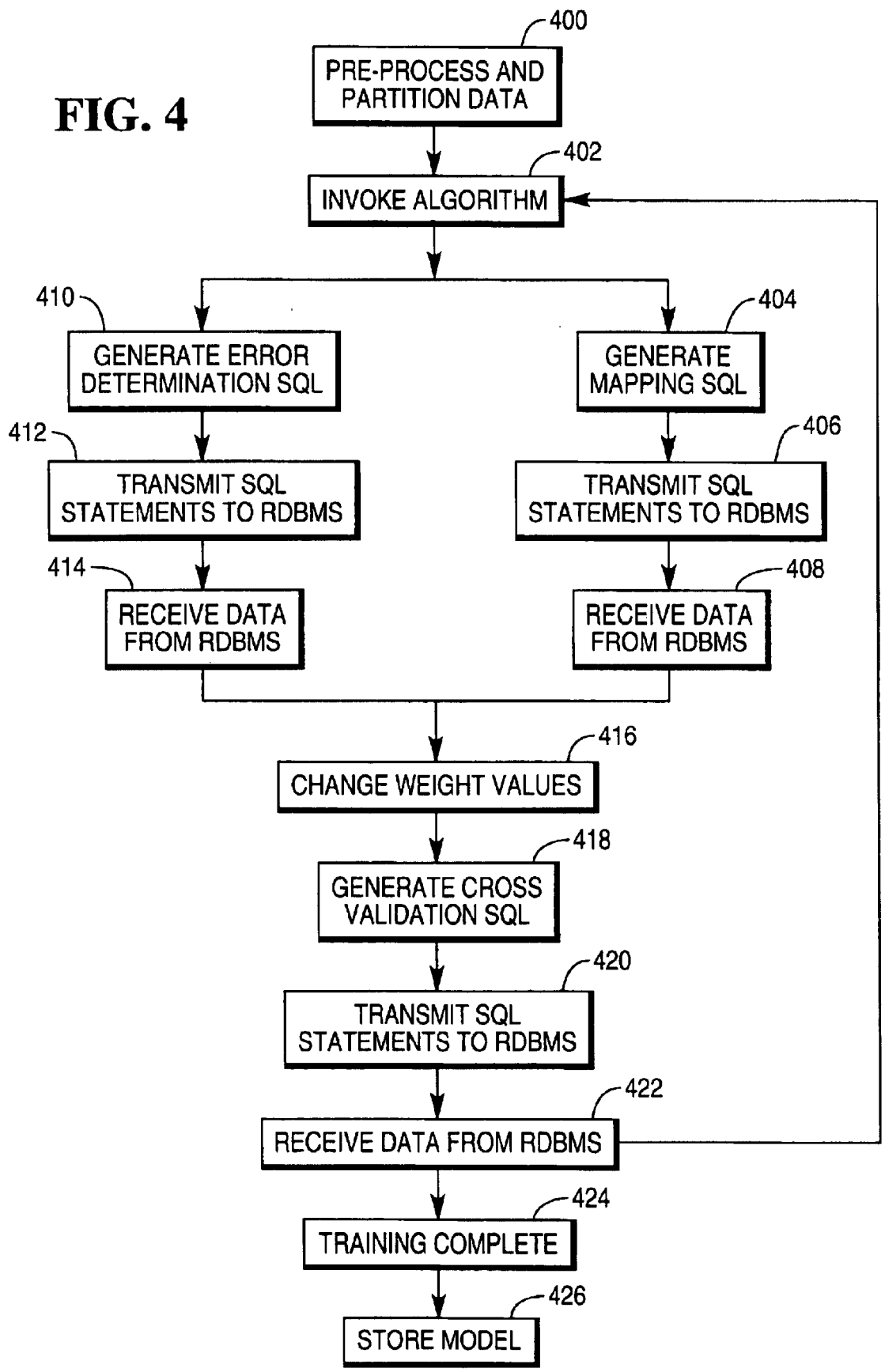

Flowcharts which illustrate the logic of the preferred embodiment of the present invention are provided in FIGS. 3, 4 and 5. Those skilled in the art will recognize that this logic is provided for illustrative purposes only and that different logic may be used to accomplish the same results.

Referring to FIG. 3, this flowchart illustrates the logic of the Scalable Data Mining Functions 202 according to the preferred embodiment of the present invention.

Block 300 represents the one or more of the Scalable Data Mining Functions 202 being created via the API 204. This may entail, for example, the instantiation of an object providing the desired function.

Block 302 represents certain parameters being passed to the API 204, in order to control the operation of the Scalable Data Mining Functions 202.

Block 304 represents the metadata in the Analytic LDM 200 being accessed, if necessary for the operation of the Scalable Data Mining Function 202.

Block 306 represents the API 204 generating a Scalable Data Mining Function 204 in the form of a data mining query based on the passed parameters and optional metadata.

Block 308 represents the Scalable Data Mining Function 204 being passed to the RDBMS 114 for execution.

Referring to FIG. 4, this flowchart illustrates the logic of the Analytic Algorithm 206 for an enhanced back-propagation neural network according to the preferred embodiment of the present invention.

Block 400 represents the data in the relational database 116 being pre-processed and partitioned into training, testing and validation data sets. Such partitioning may be performed by sampling or other methods.

Block 402 represents the Analytic Algorithm 206 for enhanced back-propagation neural network processing being invoked, either directly or via the Analytic Algorithm API 214. In the preferred embodiment, the Analytic Algorithm 206 for enhanced back-propagation neural network processing includes both dynamically-generated SQL statements, as well as programmatic iteration. Generally, the SQL statements and programmatic iteration perform the following steps.

Blocks 404–408 represent the Analytic Algorithm 206 mapping data in a training data set to nodes in the neural network, wherein the data is processed as it moves from an input node of the neural network through a hidden node of the neural network to an output node of the neural network Generally, these steps include dynamically generating SQL statements to perform the mapping function in the RDBMS 114, transmitting the SQL statements to the RDBMS 114, and then receiving the result data from the RDBMS 114.

Blocks 410–414 represent the Analytic Algorithm 206 determining an error difference between the output node's value and a target value, as the data is mapped to the nodes in the neural network Generally, these steps include dynamically generating SQL statements to perform the error determining function in the RDBMS 114, transmitting the SQL statements to the RDBMS 114, and then receiving the result data from the RDBMS 114.

Blocks 410–414 are also known as an error derivation function, the results of which are used by the following step in Block 416, which needs to know a partial derivative of the mean squared error with respect to a weight value for each node in the network The partial derivative of the mean squared error is simply the sum of the error differences on each row of input data, which are calculated using dynamically-generated SQL statements. The partial derivatives determine what changes to make in the weight values prior to a next epoch in the training of the neural network.

Block 416 represents the Analytic Algorithm 206 changing a weight value for one or more nodes in the neural network based on an accumulated error difference for the node. Changes in the weight values are used to get the neural network to converge on a solution. When the next epoch of training is performed, as indicated by the transfer of control from Block 422 to Block 402, the new weight values are substituted for previous weight values in the dynamically-generated SQL. That is, the SQL statements are altered to use the new weight values in the Blocks 404–408 and 410–414.

Blocks 418–422 represent the Analytic Algorithm 206 cross-validating the changed weight value to prevent overfitting the nodes of the neural network Generally, these steps include dynamically generating SQL statements to perform the cross-validating function in the RDBMS 114, transmitting the SQL statements to the RDBMS 114, and then receiving the result data from the RDBMS 114.

Cross validation is achieved by interrupting the training cycle periodically, after some number of epochs as determined by a user-defined parameter, and then iteratively performing the mapping and determining functions of Blocks 404–408 and 410–414, wherein a new weight value is substituted for a previous weight value for each iteration.

As noted, the cross validation function is performed using dynamically-generated SQL statements directly on a validation data set in the relational database 116. The SQL statements required are essentially the same as that used for the mapping and determining functions in Blocks 404–408 and 410–414, but in this case, the error difference is summed over all output nodes rather than summing the error differences for each individual node, and this summed error difference is saved along with the current weight values in use when training was interrupted.

If the sum of the error differences has increased in absolute value since the last training cycle, then the training cycle is stopped at Block 424, and the previously saved weights are used in the final model of the neural network. Alternative techniques for stopping training, and thus completing the construction of the neural network model include stopping after a fixed number of epochs, or after a fixed amount of elapsed time.

Once the neural network model is trained, Block 426 represents the resulting model of the neural network being stored in the Analytic LDM 200, wherein the model comprises the layout of the neural network with regard to input, hidden and output nodes, and the values of the weights attached to each connection between nodes. The Analytic IDM 200 can then be used for subsequent applications, i.e., to predict the value of the output nodes when applied against another data set. This is performed by dynamically generating SQL statements according to the neural network configuration and weight values in the Analytic LDM 200, and then executing the SQL statements against other data in order to generate predictions for the other data. This essentially re-creates the mapping function of Blocks 404–408 by applying the resulting Analytic LDM 200 to data stored in the relational database 116.

Referring to FIG. 5, this flowchart illustrates the logic performed by the RDBMS 114 according to the preferred embodiment of the present invention.

Block 500 represents the RDBMS 114 receiving a query or other SQL statements.

Block 502 represents the RDBMS 114 analyzing the query.

Block 504 represents the RDBMS 114 generating a plan that enables the RDBMS 114 to retrieve the correct information from the relational database 116 to satisfy the query.

Block 506 represents the RDBMS 114 compiling the plan into object code for more efficient execution by the RDBMS 114, although it could be interpreted rather than compiled.

Block 508 represents the RDBMS 114 initiating execution of the plan.

Block 510 represents the RDBMS 114 generating results from the execution of the plan.

Block 512 represents the RDBMS 114 either storing the results in the Analytic LDM 200, or returning the results to the Analytic Algorithm 206, APPL 110, and/or Client 118.

Conclusion

This concludes the description of the preferred embodiment of the invention. The following describes an alternative embodiment for accomplishing the same invention. Specifically, in an alternative embodiment, any type of computer, such as a mainframe, minicomputer, or personal computer, could be used to implement the present invention.

In summary, the present invention discloses a method, apparatus, and article of manufacture for performing data mining applications in a relational database management system. At least one analytic algorithm for enhanced back-propagation neural network processing is performed by a computer, wherein the analytic algorithm for enhanced back-propagation neural network processing includes SQL statements performed by the relational database management system directly against the relational database and programmatic iteration. The analytic algorithm for enhanced back-propagation neural network processing operates on data in the relational database that has been partitioned into training, testing and validation data sets. The analytic algorithm for enhanced back-propagation neural network processing maps data in a training data set to nodes in the neural network, wherein the data is processed as it moves from an input node of the neural network through a hidden node of the neural network to an output node of the neural network. In addition, the analytic algorithm for enhanced back-propagation neural network processing determines an error difference between the output node's value and a target value as the data is mapped to the output node in the neural network, and changes a weight value for one or more of the nodes based on an accumulation of the error difference for the node, in order to get the neural network to converge on a solution. Finally, the analytic algorithm for enhanced back-propagation neural network processing cross-validates the changed weight value to prevent overfitting the node.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented system for performing data mining applications, comprising:
   (a) a computer having one or more data storage devices connected thereto;
   (b) a relational database management system, executed by the computer, for managing a relational database stored on the data storage devices; and
   (c) at least one analytic algorithm, performed by the computer, for enhanced back-propagation neural network processing, wherein the analytic algorithm performs data intensive aspects of neural network training and cross validation directly within the relational database management system using dynamically-generated SQL statements, and then processes data retrieved from the relational database management system using a neural network.

2. The system of claim 1, wherein the analytic algorithm for enhanced back-propagation neural network processing includes:
   means for mapping data in a training data set to nodes in the neural network, wherein the data is processed as it moves from an input node of the neural network trough a hidden node of the neural network to an output node of the neural network,
   means for determining an error difference between the output node's value and a target value as the data is mapped to the output node in the neural network,
   means for changing a weight value for one or more of the nodes based on an accumulation of the error difference for the node, in order to get the neural network to converge on a solution, and
   means for cross-validating the changed weight value to prevent overfitting the node.

3. The system of claim 2, wherein the error difference between the output node's value and the target value comprises a partial derivative of a mean squared error with respect to the weight value.

4. The system of claim 2, wherein the partial derivative of the mean squared error with respect to the weight value is a sum of the derivatives on each row of the data.

5. The system of claim 2, wherein the partial derivative of the mean squared error is used to determine the changes to be made to the weight value prior to a next epoch.

6. The system of claim 2, wherein the changed weight value is based on an accumulation of the derivatives with respect to the weight value.

7. The system of claim 2, further comprising means for iteratively performing the means for mapping and means for determining, wherein a new weight value is substituted for a previous weight value for each iteration.

8. The system of claim 2, wherein the means for cross-validating comprises means for periodically interrupting a training cycle after a pre-determined number of epochs.

9. The system of claim 2, wherein the error difference is summed over all the rows in the training data set, and the summed error difference is saved along with a current weight value when the training cycle is interrupted.

10. The system of claim 2, further comprising means for stopping the training cycle, and using previously saved weight values in a final neural network model if the error difference has increased in absolute value since a last training cycle.

11. The system of claim 2, wherein the means for cross-validating comprises means for summing the error difference over all of the output nodes.

12. The system of claim 2, wherein the training cycle is stopped after a fixed number of epochs or a fixed amount of elapsed time.

13. The system of claim 2, wherein a resulting Analytic Logical Data Model comprises a layout of the neural network with regard to the input, hidden and output nodes, and the weight values for each connection between the nodes.

14. A method for performing data mining applications, comprising:
   (a) managing a relational database stored on one or more data storage devices connected to a computer; and
   (b) performing at least one analytic algorithm for enhanced back-propagation neural network processing in the computer, wherein the analytic algorithm performs data intensive aspects of neural network training and cross validation directly within the relational database management system using dynamically-generated SQL statements, and then processes data retrieved from the relational database management system using a neural network.

15. The method of claim 14, wherein the analytic algorithm for enhanced back-propagation neural network processing includes:
   mapping data in a training data set to nodes in the neural network, wherein the data is processed as it moves from an input node of the neural network through a hidden node of the neural network to an output node of the neural network,
   determining an error difference between the output node's value and a target value as the data is mapped to the output node in the neural network,
   changing a weight value for one or more of the nodes based on an accumulation of the error difference for the node, in order to get the neural network to converge on a solution, and cross-validating the changed weight value to prevent overfitting the node.

16. The method of claim 15, wherein the error difference between the output node's value and the target value comprises a partial derivative of a mean squared error with respect to the weight value.

17. The method of claim 15, wherein the partial derivative of the mean squared error with respect to the weight value is a sum of the derivative on each row of the data.

18. The method of claim 15, wherein the partial derivative of the mean squared error is used to determine the changes to be made to the weight value prior to a next epoch.

19. The method of claim 15, wherein the changed weight value is based on an accumulation of the derivatives with respect to the weight value.

20. The method of claim 15, further comprising iteratively performing the mapping and determining steps, wherein a new weight value is substituted for a previous weight value for each iteration.

21. The method of claim 15, wherein the cross-validating step comprises periodically interrupting a training cycle after a pre-determined number of epochs.

22. The method of claim 15, wherein the error difference is summed over all the rows in the training data set, and the summed error difference is saved along with a current weight value when the training cycle is interrupted.

23. The method of claim 15, further comprising stopping the training cycle, and using previously saved weight values in a final neural network model, if the error difference has increased in absolute value since a last training cycle.

24. The method of claim 15, wherein the cross-validating step comprises summing the error or difference over all of the output nodes.

25. The method of claim 15, wherein the training cycle is stopped after a fixed number of epochs or a fixed amount of elapsed time.

26. The method of claim 15, wherein a resulting Analytic Logical Data Model comprises a layout of the neural network with regard to the input, hidden and output nodes, and the weight values for each connection between the nodes.

27. An article of manufacture comprising logic embodying a method for performing data mining applications, comprising:

(a) managing a relational database stored on one or more data storage devices connected to a computer; and (b) performing at least one analytic algorithm for enhanced back-propagation neural network processing in the computer, wherein the analytic algorithm performs data intensive aspects of neural network training and cross validation directly within the relational database management system using dynamically-generated SQL statements, and then processes data retrieved from the relational database management system using a neural network.

28. The article of manufacture of claim 27, wherein the analytic algorithm for enhanced back-propagation neural network processing includes:

mapping data in a training data set to nodes in the neural network, wherein the data is processed as it moves from an input node of the neural network though a hidden node of the neural network to an output node of the neural network, determining an error difference between the output node's value and a target value as the data is mapped to the output node in the neural network, changing a weight value for one or more of the nodes based on an accumulation of the error difference for the node, in order to get the neural network to converge on a solution, and cross-validating the changed weight value to prevent overfitting the node.

29. The article of manufacture of claim 28, wherein the error difference between the output node's value and the target value comprises a partial derivative of a mean squared error with respect to the weight value.

30. The article of manufacture of claim 28, wherein the partial derivative of the mean squared error with respect to the weight value is a sum of the derivatives on each row of the data.

31. The article of manufacture of claim 28, wherein the partial derivative of the mean squared error is used to determine the changes to be made to the weight value prior to a next epoch.

32. The article of manufacture of claim 28, wherein the changed weight value is based on an accumulation of the derivatives with respect to the weight value.

33. The article of manufacture of claim 28, further comprising iteratively performing the mapping and determining steps, wherein a new weight value is substituted for a previous weight value for each iteration.

34. The article of manufacture of claim 28, wherein the cross-validating step comprises periodically interrupting a training cycle after a pre-determined number of epochs.

35. The article of manufacture of claim 28, wherein the error difference is summed over all the rows in the training data set, and the summed error difference is saved along with a current weight value when the training cycle is interrupted.

36. The article of manufacture of claim 28, further comprising stopping the training cycle, and using previously saved weight values in a final neural network model, if the error difference has increased in absolute value since a last training cycle.

37. The article of manufacture of claim 28, wherein the cross-validating step comprises summing the error difference over all of the output nodes.

38. The article of manufacture of claim 28, wherein the training cycle is stopped after a fixed number of epochs or a fixed amount of elapsed time.

39. The article of manufacture of claim 28, wherein a resulting Analytic Logical Data Model comprises a layout of the neural network with regard to the input, hidden and output nodes, and the weight values for each connection between the nodes.

* * * * *

UNITED STATES PATENT AND TRADEMARK OFFICE
CERTIFICATE OF CORRECTION

PATENT NO.   : 6,704,717 B1
DATED        : March 9, 2004
INVENTOR(S)  : Brian Tate It is certified that error appears in the above-identified patent and that said Letters Patent is hereby corrected as shown below:

<u>Column 13,</u>
Line 54, after "network" delete "trough" and insert -- through --.

Signed and Sealed this

Thirty-first Day of January, 2006

JON W. DUDAS
*Director of the United States Patent and Trademark Office*